Patented Nov. 16, 1937

2,099,353

UNITED STATES PATENT OFFICE 2,099,353

BITUMINOUS EMULSION

Preston R. Smith, Rahway, N. J., assignor, by mesne assignments, to The Barber Company, Inc., Philadelphia, Pa., a corporation of New Jersey No Drawing. Application January 27, 1934, Serial No. 708,701

15 Claims. (Cl. 134—1)

This invention relates to bituminous emulsions, and more particularly to emulsions of the clay type, dried films of which are rendered resistant to water by the incorporation in the emulsions and in the films resulting therefrom of certain substances.

Emulsions of certain types consisting only of an emulsifying agent, a bitumen and water give dry films which are fairly resistant to the action of water. That is, reemulsification does not tend to take place readily so that surfaces carrying films of the emulsion may be exposed to the weather, i. e. rain or dampness, without substantial effect thereon. On the other hand, various bituminous emulsions, notably those in which clay is used as the emulsifying agent, give films which are very sensitive to the action of water, reemulsification taking place very readily. It has been found that the addition of various substances to such emulsions will render the films substantially unaffected by the action of water.

The present invention relates to bituminous emulsions particularly of the clay type in which a material such as bentonite, or other colloidal clay or insoluble metallic oxide, hydroxide or silicate having a substantial proportion of particles of a colloidal character, is used as the emulsifying agent and in which there is incorporated a salt of a metal such as lead, titanium, zirconium, or tin, falling in the fourth periodic group as given, for example, in Mellor's Modern Inorganic Chemistry, 1920.

To illustrate the action of these salts in rendering the films resulting from the emulsion resistant to water, the effects produced by the addition of various substances in accordance with the present invention will be considered when these substances are added to a basic bituminous emulsion, films of which are destroyed very readily by the application of water. This basic emulsion which will be hereafter discussed is a bituminous emulsion of the oil-in-water type in which bentonite is used as the emulsifying agent and which has the following composition:

| | Per cent | Per cent | Per cent |
|---|---|---|---|
| Bitumen | 45 to 67, | preferably | 50 |
| Bentonite | 2 to 10, | preferably | 7.5 |
| Water | 35 to 55, | preferably | 43.5 |

In the following examples where a percentage of salt in the emulsion is given it means that the finished emulsion contained the indicated quantity of the salt.

If lead chromate, $PbCrO_4$, is incorporated in the above emulsion in amounts ranging from 0.5% to 10% the resulting films are unaffected by water. This chromate accordingly is very effective even though it is substantially insoluble in water. Basic lead chromate exhibits similar effects when present in the same proportions.

The halides of lead, namely, the fluoride, $PbF_2$, the chloride, $PbCl_2$, the bromide, $PbBr_2$, and the iodide, $PbI_2$, in proportions ranging from 1 to 10% produce emulsions which give films entirely unaffected by water. The films are in some cases granular since these substances are relatively insoluble.

Lead acetate, $Pb(C_2H_3O_2)_2.3H_2O$, in proportions from 1 to 10% thickens the emulsion and the resulting films are unaffected by water.

Lead nitrate, $Pb(NO_3)_2$, in the same proportions produces similar results.

Lead sulphate, $PbSO_4$, even though quite insoluble produces films which are entirely unaffected when used in proportions ranging from 5 to 10%. The resulting films are in general somewhat granular for reasons given above.

Titanium tetrafluoride, $TiF_4.2H_2O$, is quite effective in the range 0.5 to 10% to produce water resilient films.

Titanium trichloride, $TiCl_3$, used in proportions from 0.5% to 10% produces films which are entirely unaffected by water. This salt thickens the emulsions to a substantial degree. The salt is considerably hydrolyzed by water.

Zirconium nitrate, $Zr(NO_3)_4.5H_2O$, is effective in the range 0.5 to 5% to produce films similar to the above. Zirconium nitrate is also strongly hydrolyzed by water.

Stannous chloride, $SnCl_2.2H_2O$, and stannic iodide, $SnI_4$, are representative of the tin halides being effective in proportions ranging from 0.5 to 10% to produce films which are unaffected by water. These halides in general result in a thickening of the emulsion.

Stannous sulphate, $SnSO_4$, and stannic sulphate, $Sn(SO_4)_2.2H_2O$, are similar in results producing films resistant to water when used in ranges from about 0.5% to 10%.

The insoluble stannous phosphate, $Sn_3(PO_4)_2$, in proportions from 2 to 10% gives films which are resistant to water. Probably because of the substantial insolubility of this salt it does not thicken the emulsion.

Stannic phosphate which is represented by the formula $2SnO_2.P_2O_5.10H_2O$, gives results similar to the stannous phosphate.

From the above it will be seen that dried films of water emulsions are rendered resistant to water by the addition of small amounts of salts of metals of the fourth periodic group, these salts being quite effective even though their solubility in water is low. In most cases amounts of less than 1% are effective to produce water resistant films even though the emulsion used as a basis for comparison gives films which are very readily destroyed by water.

While the above examples are given with reference to an emulsion which gives films of very poor character from the standpoint of water resistance similar results are found to be given with other clay emulsions. If the basic clay emulsion used is of a character giving films having substantial resistance to water, then it is possible to use much smaller percentages of the added substances to attain complete resistance to washing.

It is to be noted that whereas certain of the salts substantially thicken the emulsion, others do not appear to have this effect. The thickening is apparently caused primarily by those substances which have the greatest solubility.

The various substances can be added to the previous emulsion or added to the clay before the asphalt is emulsified thereby. So long as the substance is finally incorporated in the emulsion it does not seem to be material how the addition thereof is effected.

It is not contemplated that oxides are or shall be considered to be equivalents for the salts defined by the claims appended hereto.

What I claim and desire to protect by Letters Patent is:

1. An aqueous clay emulsion of bitumen of the oil-in-water type containing a lead salt in amount capable of rendering dry films formed from the emulsion substantially resistant to water.

2. An aqueous clay emulsion of bitumen of the oil-in-water type containing a tin salt in amount capable of rendering dry films formed from the emulsion substantially resistant to water.

3. An aqueous clay emulsion of bitumen of the oil-in-water type containing a titanium salt in amount capable of rendering dry films formed from the emulsion substantially resistant to water.

4. A bituminous coating formed by the evaporation of water from an aqueous clay emulsion of bitumen of the oil-in-water type containing a lead salt, the coating being substantially resistant to water.

5. A bituminous coating formed by the evaporation of water from an aqueous clay emulsion of bitumen of the oil-in-water type containing a tin salt, the coating being substantially resistant to water.

6. A bituminous coating formed by the evaporation of water from an aqueous clay emulsion of bitumen of the oil-in-water type containing a titanium salt, the coating being substantially resistant to water.

7. An aqueous clay emulsion of bitumen of the oil-in-water type containing a salt selected from the group consisting of the halides and nitrates of a metal of the fourth periodic group in amount capable of rendering dry films formed from the emulsion substantially resistant to water.

8. An aqueous clay emulsion of bitumen of the oil-in-water type containing a salt selected from the group consisting of the halides and nitrates of lead, titanium, zirconium and tin in amount capable of rendering dry films formed from the emulsion substantially resistant to water.

9. An aqueous clay emulsion of bitumen of the oil-in-water type containing in solution a salt selected from the group consisting of the halides and nitrates of a metal of the fourth periodic group in amount capable of rendering dry films formed from the emulsion substantially resistant to water.

10. A bituminous coating formed by the evaporation of water from an aqueous clay emulsion of bitumen of the oil-in-water type containing a salt selected from the group consisting of the halides and nitrates of a metal of the fourth periodic group, the coating being substantially resistant to water.

11. A bituminous coating formed by the evaporation of water from an aqueous clay emulsion of bitumen of the oil-in-water type containing a salt selected from the group consisting of the halides and nitrates of lead, titanium, zirconium and tin, the coating being substantially resistant to water.

12. An aqueous clay emulsion of bitumen of the oil-in-water type containing a salt of a metal of the fourth periodic group in amount capable of rendering dry films formed from the emulsion substantially resistant to water.

13. An aqueous clay emulsion of bitumen of the oil-in-water type containing in solution a salt of a metal of the fourth periodic group in amount capable of rendering dry films formed from the emulsion substantially resistant to water.

14. A bituminous coating formed by the evaporation of water from an aqueous clay emulsion of bitumen of the oil-in-water type containing a salt of a metal of the fourth periodic group, the coating being substantially resistant to water.

15. A bituminous coating formed by the evaporation of water from an aqueous clay emulsion of bitumen of the oil-in-water type containing in solution a salt of a metal of the fourth periodic group, the coating being substantially resistant to water.

PRESTON R. SMITH.